United States Patent
Taylor et al.

(10) Patent No.: US 7,511,476 B2
(45) Date of Patent: Mar. 31, 2009

(54) ELECTROMAGNETIC SENSOR SYSTEMS AND METHODS OF USE THEREOF

(75) Inventors: G. Brandt Taylor, Berlin, MA (US); Steven E. Beard, Berlin, MA (US)

(73) Assignee: Digisensors, Inc., Berlin, MA (US)

( * ) Notice: Subject to any disclaimer, the term of this patent is extended or adjusted under 35 U.S.C. 154(b) by 401 days.

(21) Appl. No.: 11/325,143

(22) Filed: Jan. 4, 2006

(65) Prior Publication Data

US 2006/0145689 A1 Jul. 6, 2006

Related U.S. Application Data

(63) Continuation-in-part of application No. PCT/US2005/007363, filed on Mar. 7, 2005.

(60) Provisional application No. 60/719,141, filed on Sep. 21, 2005, provisional application No. 60/641,225, filed on Jan. 4, 2005.

(51) Int. Cl.
*G01B 7/14* (2006.01)
*G01B 7/30* (2006.01)
*H03B 1/00* (2006.01)
*H03B 5/00* (2006.01)

(52) U.S. Cl. .................. 324/207.15; 324/207.25; 331/36 R; 331/65

(58) Field of Classification Search .................. 331/1 R, 331/36 R, 36 C, 36 L, 65–66, 167; 340/545.2–545.9, 340/547–549, 686.1–686.6, 941; 361/299.1, 361/280–281; 336/10, 30; 73/862.626, 718, 73/724; 324/207.15, 207.18, 207.24–207.26, 324/239

See application file for complete search history.

(56) References Cited

U.S. PATENT DOCUMENTS

| | | | |
|---|---|---|---|
| 2,452,156 A | 10/1948 | Schover | 177/351 |
| 3,350,660 A | 10/1967 | Engdahl et al. | 331/65 |
| 3,397,364 A | 8/1968 | Crandall | 331/65 |
| 3,461,400 A | 8/1969 | Koda | 331/65 |
| 3,521,158 A | 7/1970 | Morrow et al. | 324/34 |
| 3,609,580 A | 9/1971 | Thompson et al. | 331/65 |
| 3,619,805 A | 11/1971 | Bean | 331/65 |
| 3,701,041 A | 10/1972 | Adler et al. | 331/65 |
| 3,732,503 A | 5/1973 | Rapp et al. | 331/65 |
| 3,735,244 A | 5/1973 | Gumtau et al. | 323/51 |
| 3,756,081 A | 9/1973 | Young | 73/336.5 |
| 3,760,392 A | 9/1973 | Stich | 340/200 |
| 3,818,369 A | 6/1974 | Brocker | 331/65 |
| 3,848,466 A * | 11/1974 | Dial et al. | 374/147 |
| 3,891,918 A | 6/1975 | Ellis | 324/34 D |
| 3,995,233 A * | 11/1976 | Waku | 331/116 R |
| 4,068,189 A | 1/1978 | Wilson | 331/65 |
| 4,182,986 A * | 1/1980 | Parker | 324/236 |
| 4,284,961 A | 8/1981 | Landau | 331/65 |
| 4,310,807 A | 1/1982 | McKee | 331/65 |
| 4,618,835 A | 10/1986 | Wilson | 331/65 |
| 4,663,542 A | 5/1987 | Buck et al. | 327/517 |
| 4,809,742 A | 3/1989 | Grau | 137/554 |
| 5,079,502 A | 1/1992 | Rogacki et al. | 324/207.19 |
| 5,142,226 A | 8/1992 | Sakamoto et al. | 324/207.24 |

(Continued)

*Primary Examiner*—Bot LeDynh
(74) *Attorney, Agent, or Firm*—Burns & Levinson LLP; Jacob N. Erlich; Orlando Lopez

(57) ABSTRACT

Sensor circuits including an oscillator circuit are disclosed. In one instance, the sensing element is a variable reactance element (a variable inductor or/and capacitor).

27 Claims, 8 Drawing Sheets

U.S. PATENT DOCUMENTS

| | | | |
|---|---|---|---|
| 5,172,298 A | 12/1992 | Shimizu et al. | 361/152 |
| 5,767,672 A | 6/1998 | Guichard et al. | 324/236 |
| 6,215,365 B1 | 4/2001 | Kurkovskiy | 331/65 |
| 6,335,619 B1 | 1/2002 | Schwab et al. | 324/207.26 |
| 6,532,834 B1 | 3/2003 | Pinto et al. | 73/862.626 |
| 6,639,759 B2 | 10/2003 | Inoguchi et al. | 360/261.1 |
| 6,731,119 B2 | 5/2004 | Haffner et al. | 324/635 |
| 7,046,018 B2 | 5/2006 | Toda et al. | 324/679 |
| 2004/0056748 A1 | 3/2004 | Masaki et al. | 336/119 |

\* cited by examiner

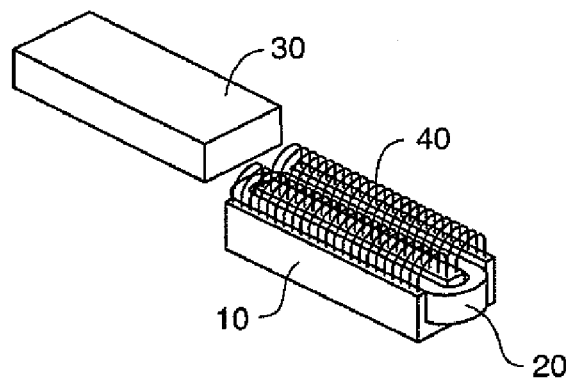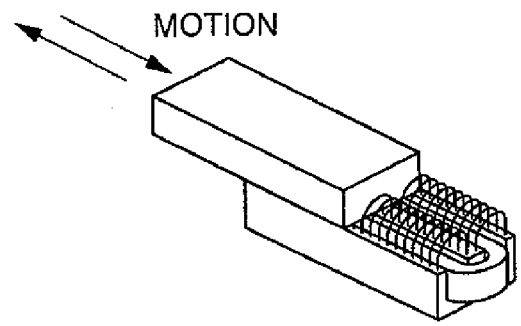
FIG. 2A  FIG. 2B
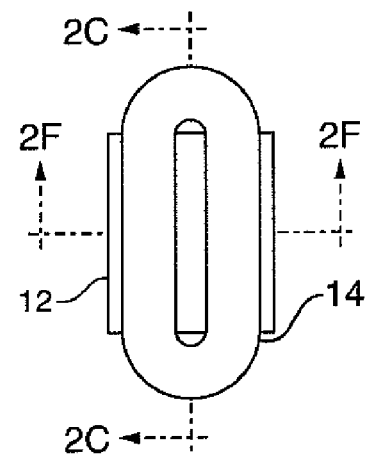
FIG. 2C
FIG. 2D
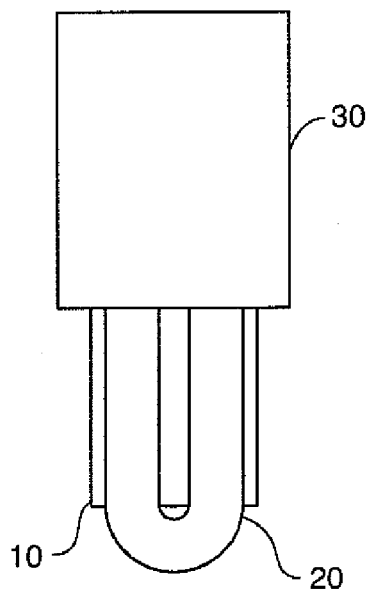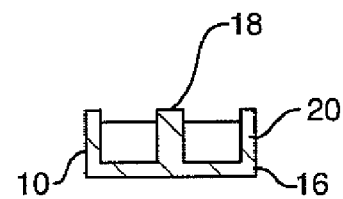
FIG. 2E
FIG. 2F

ELECTROMAGNETIC SENSOR SYSTEMS AND METHODS OF USE THEREOF

CROSS REFERENCE TO RELATED APPLICATIONS

This application is a continuation-in-part of copending International Application S.N. PCT/US2005/007363 filed Mar. 7, 2005, entitled INDUCTION SENSOR, which is incorporated by reference herein, and claims priority of U.S. Provisional Patent application Ser. No. 60/641,225, entitled INDUCTION SENSOR TECHNOLOGY, filed on Jan. 4, 2005, and of U.S. Provisional Patent application Ser. No. 60/719,141, entitled ELECTROMAGNETIC SENSOR SYSTEMS, filed on Sep. 21, 2005, both of which are also incorporated by reference herein.

BACKGROUND OF THE INVENTION

This invention relates to electro-mechanical measurement and control systems. These systems measure physical parameters as temperature, pressure, position, velocity, or acceleration and use these measurements to indicate the measured parameter or to control machinery or processes. Historically, the devices used to perform the measurement function have exploited a variable relationship between some electrical phenomenon as capacitance, resistance, inductance and the physical parameter to be measured or, have used the interplay between a magnetic field and an electrical phenomenon. The devices have had continuity of output that is analogue in nature and lends itself to use with analogue systems. Analog sensing devices have been developed to a high state of utility.

As digital electronic information processing has improved, the search has developed for digital signal sources to indicate physical parameters for measurement and system control. Interfaces have been developed that allow analogue sensing devices to be used with digital controls. However, there remains a need for sensors that have digital output and integrate seamlessly with digital equipment.

When high-speed position measurement is made with conventional devices that employ a magnetic field there is a delay between the actual position and the indicated position. This delay is referred as measurement hysteresis. This measurement hysteresis is undesirable in practice. There is a need for measurement devices with lower measurement hysteresis.

BRIEF SUMMARY OF THE INVENTION

In one embodiment, the system of this invention includes an oscillator circuit. In one instance, the sensing element is a variable reactance element (a variable inductor or/and capacitor).

For a better understanding of the present invention, together with other and further needs thereof, reference is made to the accompanying drawings and detailed description and its scope will be pointed out in the appended claims.

BRIEF DESCRIPTION OF THE DRAWINGS

FIGS. 2a-2f depict an embodiment of a sensing element of this invention;

DETAILED DESCRIPTION OF THE INVENTION

Figure 1A:
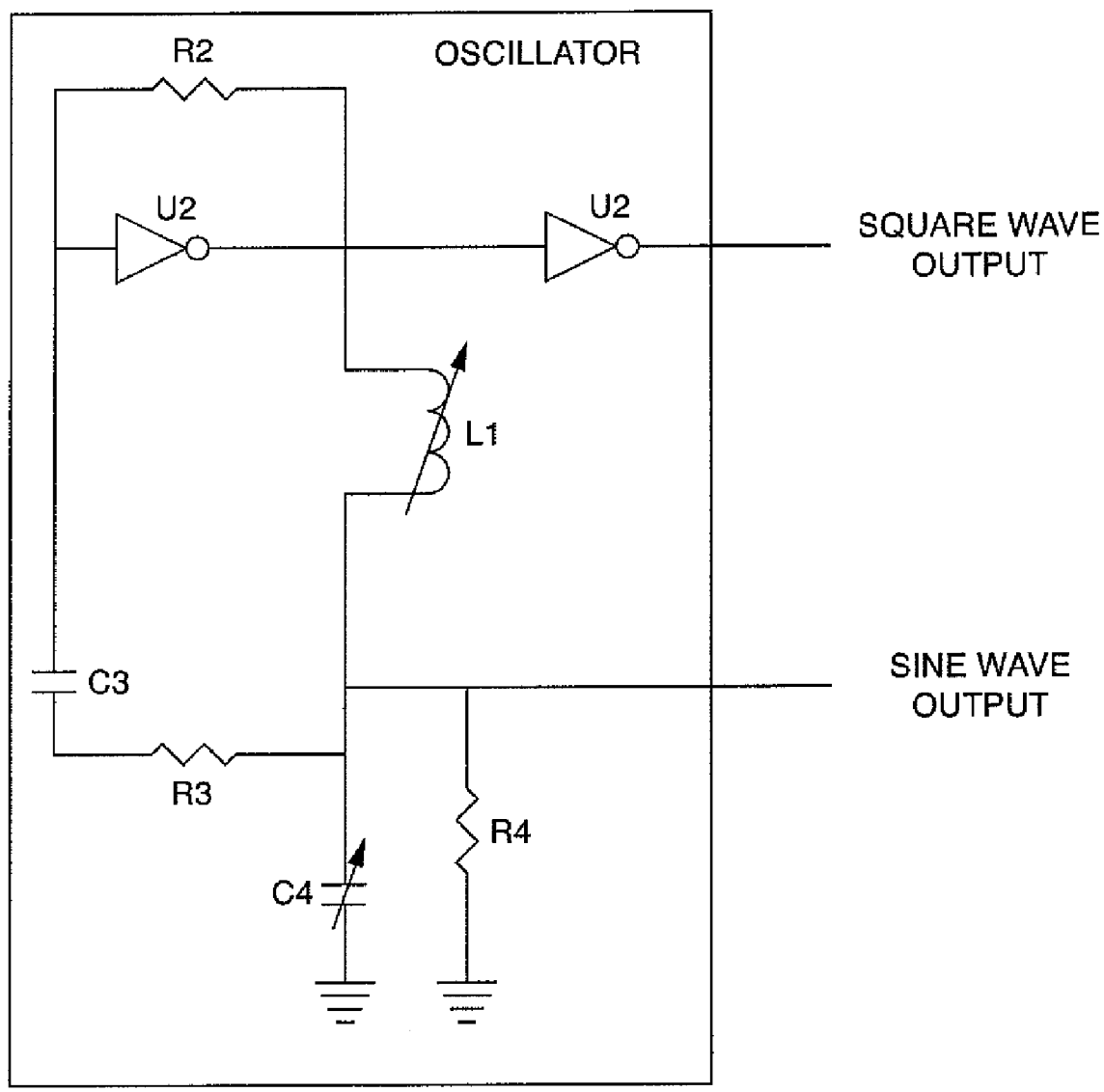
FIG. 1a is an embodiment of the system of the present invention.

An embodiment of the system of the present invention is shown in FIG. 1a. The circuit shown in FIG. 1a is a tuned oscillator circuit. The tuned oscillator circuit is comprised of an amplifier (U2) and two reactive components, an inductor L1 and a capacitor C4. L1 and C4 are in series connection with C4 connected to ground (return) and L1 connected to the output of the amplifier U2. The frequency of the oscillator is:

$$F = \frac{1}{2\pi\sqrt{L1 * C}}$$

Either one or both of the two reactive components, L1 and C4, can be used as the sensing component. In one embodiment, the inductor L1 is a variable inductor and is the sensing component. In that embodiment, the capacitor C4 is a fixed value capacitor (fixed capacitance). In another embodiment, the physical structure that comprises the inductor L1 also exhibits variable capacitance (as, for example, but not limited to, the situation in which the electric and magnetic fields of physical structure are modified while performing a measurement). In that embodiment, an equivalent capacitor can be defined for C4, where the equivalent capacitor includes both the variable component from the physical structure that comprises the inductor L1 and the fixed component of the fixed value capacitor. (Such an equivalent can be obtained by combining the variable capacitance from the physical structure with the fixed capacitor by methods such as, but not limited to, addition of capacitance, Norton or Thevenin equivalents or capacitances in series.) In a further embodiment, the inductor L1 is a fixed inductor and the capacitor C4 is a variable capacitor. (In the later embodiment, the variable inductor reduces to a fixed inductor or fixed inductance.) By using a reactive component of the oscillator circuit shown in FIG. 1a as a sensor and taking the frequency (period) as the output of the sensor, a signal is generated that can be provided directly to digital electronic equipment without conversion.

In one embodiment, the amplifier U2 shown in FIG. 1a is a high speed CMOS hex inverter. The resistor R2 is used to bias the input of the amplifier to compensate for the leakage current. The resistor R3 and capacitor C3 provide the feedback path. The oscillator is AC coupled by capacitor C3 so that there is no DC voltage path through the oscillator. In another embodiment, a transistor amplifier or operational amplifier can be used in place of hex inverter U2. In one instance, two signals can be generated from the oscillator for use as output. One signal is a square wave and the other signal is a sine wave, both have the same frequency. In the embodiment shown in FIG. 1a, the signal from U2 to L1 is a square wave. The square wave can be utilized as the output signal of the systems shown in FIG. 1a. In the embodiment in which U2 is a hex inverter, the signal from the section of amplifier U2 that drives the inductor L1 can be provided to another section of the amplifier and the output of the second section, a square wave, can be utilized as the output signal. A square wave is preferable for some applications such as, but not limited to, input to a counter or microprocessor. Alternately, the signal at the connection between the inductor L1 and capacitor C4 is a sine wave that can also be utilized as the output signal. Exemplary applications that require sine wave input are applications where V(RMS) or isolated input are needed. In another instance, the sine wave can be rectified to provide a DC voltage signal.

Since the output signal includes both frequency and amplitude information, both the frequency and amplitude can be used to provide information on the sensed property. It should be noted that in the embodiment of the system of this invention shown in FIG. 1a, the inductor L1 is separated from ground by capacitor C4 and resistor R4 (the variable capacitor C4 provides an electrical connection between ground and the variable inductor L1). "Ground" as used herein has its customary meaning when used in connection with electrical circuits.

Figure 1B:
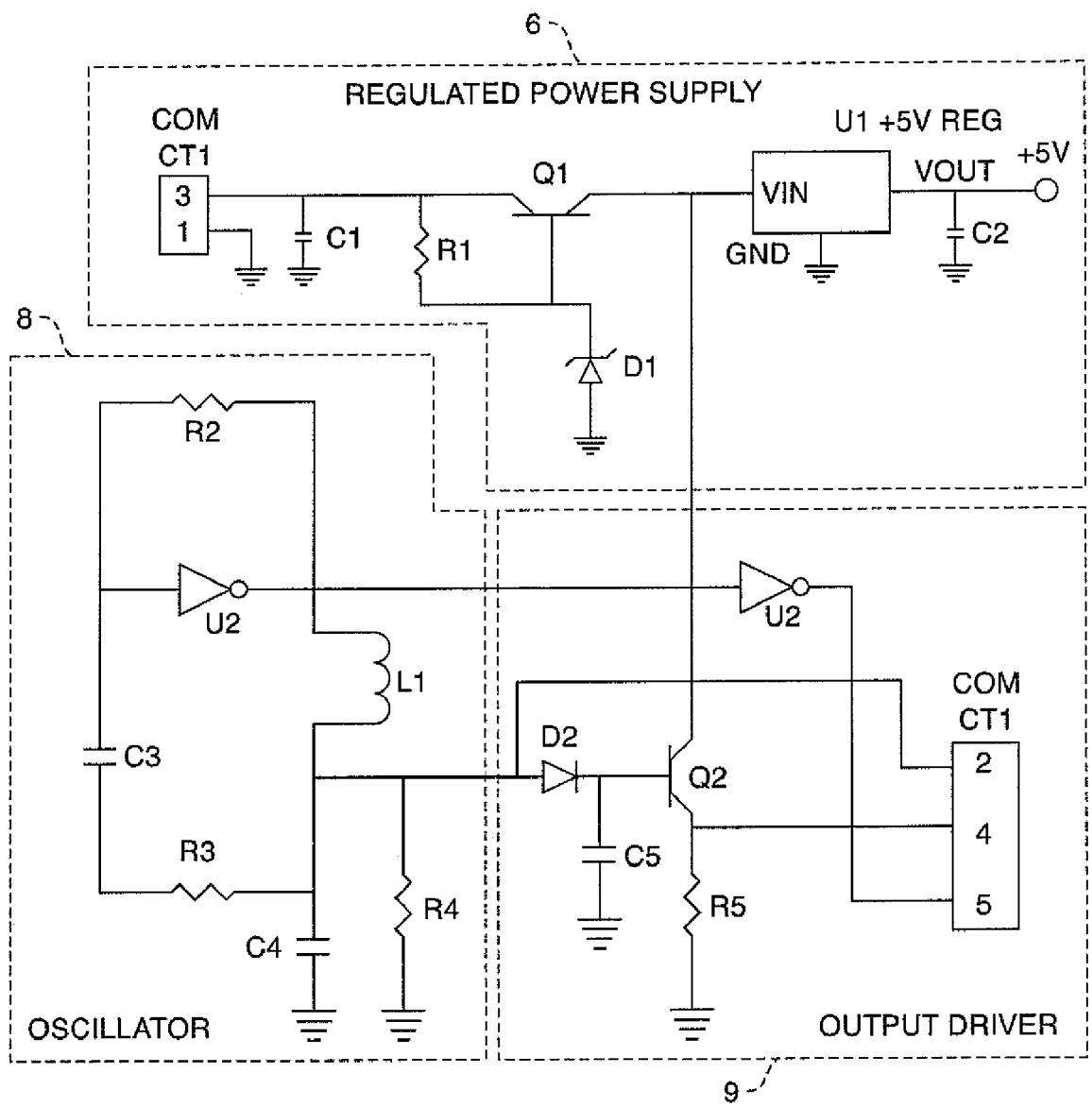
FIG. 1b is another embodiment of the system of the present invention.

FIG. 1b shows a more detailed embodiment of a position sensor circuit. The circuit has three functional blocks, a regulated power supply 6, a tuned oscillator circuit 8, and an output driver 9. The function of the regulated power supply is to allow the device to work on an input voltage of 8-50 VDC. The positive voltage is applied to pin 3 of connector CT1 and ground (return) is applied to pin 1. An on board regulated +5 VDC supply (U1) is used to power the oscillator functional block. This voltage regulator has a maximum input voltage of +16 VDC. The transistor Q1 with the base voltage limited to 15 VDC via the Zener diode D1, keeps the input voltage to U1 below the maximum tolerance. In one embodiment, the tuned oscillator circuit is the circuit of FIG. 1a. There are three output values of the circuit, a sine wave, a DC voltage, and a square wave. The sine wave is frequency output at CTI pin 2. The DC voltage value is available at CTI pin 4. The square wave is available at CTI pin 5. The diode D2 and capacitor C5 are capable of rectifying the sine wave output to a DC voltage value. The transistor Q2 is used to add some drive current to the DC voltage output signal. The inductor L1 is the inductor of FIG. 1a.

FIGS. 2a-2f show an embodiment of a sensing element that operates by projecting an electromagnetic field outside of its body (also referred to as a leaking field or fringing field sensing element). Since the electromagnetic field has both electric field a magnetic field components, embodiments such as the sensing element of FIGS. 2a-2f can be utilized as components of sensors in which the change in the electric field provides the major portion of the signal, sensors in which the change in the magnetic field provides the major portion of the signal, and sensors in which in both the change in the electric field and the magnetic field provide the signal. In one instance of the embodiment shown in FIGS. 2a-2f, the sensing element 20 is a coil with an oval shape and resides in a ferrite core 10 that has a corresponding oval shape. (The embodiment shown in FIGS. 2a-2e is an embodiment of a structure including a first substructure 10 having a first end portion 12, a second end portion 14, a base portion 16, a central portion 18, a coil 20 and a second substructure 30. Although a ferrite core is used in one embodiment, embodiments utilizing other materials of different magnetic permeability are also within the scope of this invention. Many factors influence the choice of material including, but not limited to, the output characteristics of the circuit such as the circuit in FIG. 1a. Ferrite is an embodiment of a ferrimagnetic material.)

The field 40 projected by the sensor of FIGS. 2a-2f is elongated along the long axis of the oval. The position of the actuator 30 moving in that field in a plane parallel to the axis of the oval can be detected. It should be noted that, although the embodiment shown in FIGS. 2a-2f utilizes magnetic materials to produce the field, similar embodiments, in which a voltage is utilized to produce the field, can be obtained. In such embodiments, the structure is a capacitor with significant fringing fields and the actuator 30 modifies the fringing fields. In one instance of an embodiment in which a voltage is utilized to produce the field, the central electrode 18 in FIGS. 2a-2f is electrically isolated from the other electrodes 12, 14. (In one instance, the other electrode comprises two pieces 12, 14 separated by a substantially non-conductive spacer 16.)

Modifying the structure of the electric field distribution (structure) will affect the capacitance, such as C4 in the embodiment shown in FIG. 1a, while modifying the magnetic field distribution (structure) will affect the inductance, such as L1 in the embodiment shown in FIG. 1a. In one instance, the electric field is modified by the presence of materials with different dielectric properties. (Most materials with different dielectric properties exhibit very small or no hysteresis.) In other instances, the electric field is modified by the presence of materials with high conductivity. In some instances, the magnetic field is modified by the presence of magnetic materials (material with different permeability or magnetic properties). In other instances, the magnetic field can be modified by the presence of materials with high conductivity. (Many magnetic materials exhibit magnetic hysteresis, for example, materials with high magnetic coercivity exhibit magnetic hysterisis. The presence of magnetic hysteresis can result in hysteresis in the measurement or the sensor circuit output.) The embodiments disclosed herein (above and below) describe sensors where the variable reactance is obtained from a physical structure and the physical structure includes a first substructure capable of producing a fringing electromagnetic field (such as, but not limited to, substructure 10 in FIG. 2a) and another substructure disposed proximate to the first substructure and capable of modifying the fringing electromagnetic field (such as, but not limited to, substructure 30 in FIG. 2a). The second substructure can include materials with substantially high conductivity or ferrimagnetic materials.

In one embodiment, the sensor such as, but not limited to, that shown in FIGS. 2a-2f can be used to detect radial position of a shaft. It should be noted that the applications of this invention are not limited only to that embodiment.

Figure 3A:
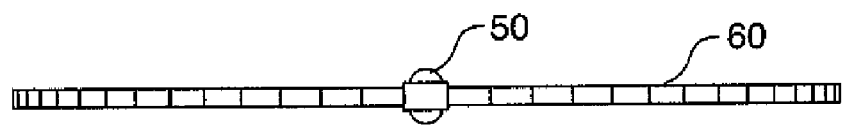
FIGS. 3a, 3b depict an application of an embodiment of a sensing element of this invention.
Figure 3B:
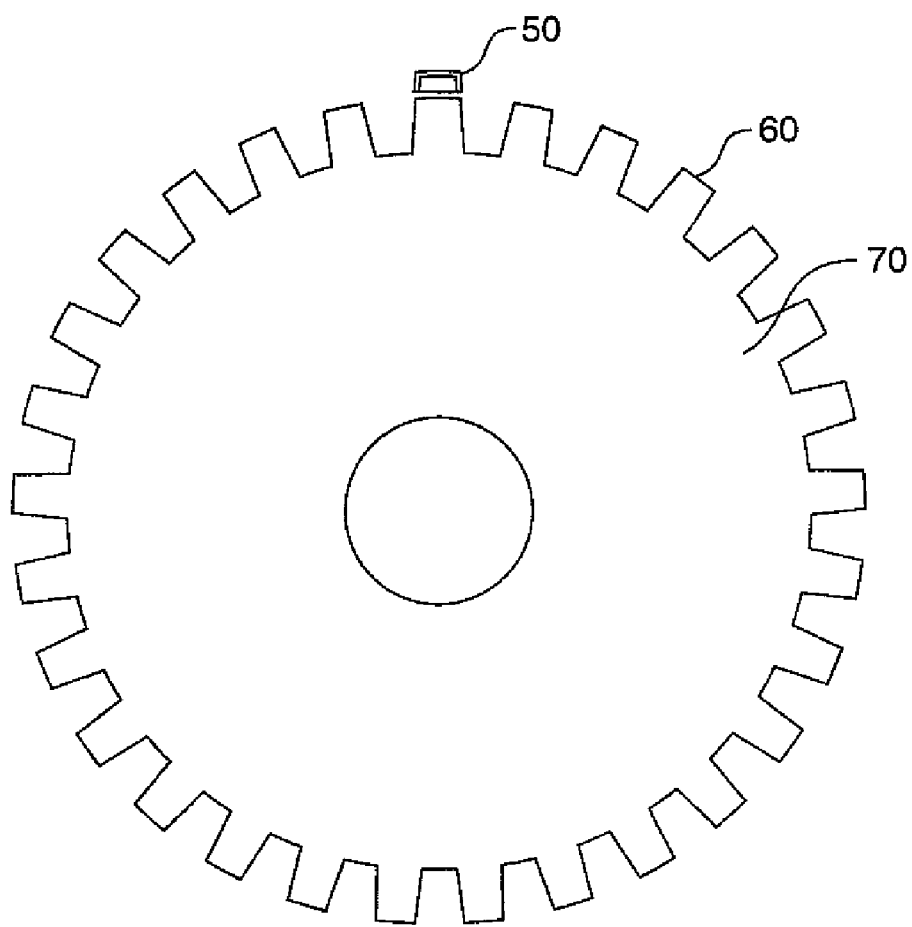

FIGS. 3a, 3b show a leaking (fringing) field sensing element 50 (such as, but not limited to, a sensor as shown in FIGS. 2a-2f) used with toothed wheel 70 (with teeth 60) for speed/position measurement of the rotating wheel. (The toothed wheel 70 is an embodiment of a structure capable of rotation and having a radially nonuniform cross-section. The toothed wheel 70 is also an instance of a second substructure that is a structure having a property to be sensed.) This arrangement is similar to that utilized in conventional Hall effect sensor use. Conventional Hall effect sensors are used in automobiles for determining engine speed and wheel speed for ABS brake applications. Conventional Hall effect sensors can suffer from hysteresis since they have a magnet in the sensor loop and interact the magnetic field with a ferro-magnetic wheel. With the sensor of FIGS. 3a, 3b the wheel can be aluminum, non-magnetic stainless steel, or a non-metallic part that has a metallic (copper, nickel, aluminum, etc) coating. The sensor in FIGS. 3a, 3b can be used when the wheel 70 is a magnetic wheel (comprised of a ferri- or ferro magnetic material), but a non-magnetic wheel can also be used and, in some instances, may be preferable. As mentioned above, the technique of interacting with the electric component of the field by variations in the field structure (due to variations in the dielectric constant or the conductivity or the geometry) produces a sensor with low hysteresis. Higher conductivity of the wheel or a higher conductivity coating may, in some instances, result in better resolution to the sensor. The sensors of this invention generate output when the wheel is stationary (at zero speed). With conventional Hall sensors, two Hall units and a differential circuit are needed to obtain zero speed performance.

During use of the embodiment of the system of this invention shown in FIGS. 3a, 3b, the angular displacement (or speed) of a rotating structure having a radially nonuniform cross-section is measured by providing a structure producing fringing electromagnetic fields where the fringing electromagnetic fields extend from the provided structure to the rotating structure, utilizing a varying reactance, determined by a relative displacement between the rotating structure and the provided structure, in an oscillator circuit, and obtaining an output indicative of a varying frequency of the oscillator circuit. The varying frequency is indicative of the angular displacement.

It should be noted that in the embodiment shown in FIGS. 2a-2f, the second substructure 30 moves in a direction substantially perpendicular to the magnetic field (flux) lines while in the embodiment shown in FIGS. 3a, 3b, the second substructure, the wheel 70, moves in a direction substantially parallel to the magnetic field (flux) lines. In both embodiments, the fringing field is modified by the second substructure.

Figure 4A:
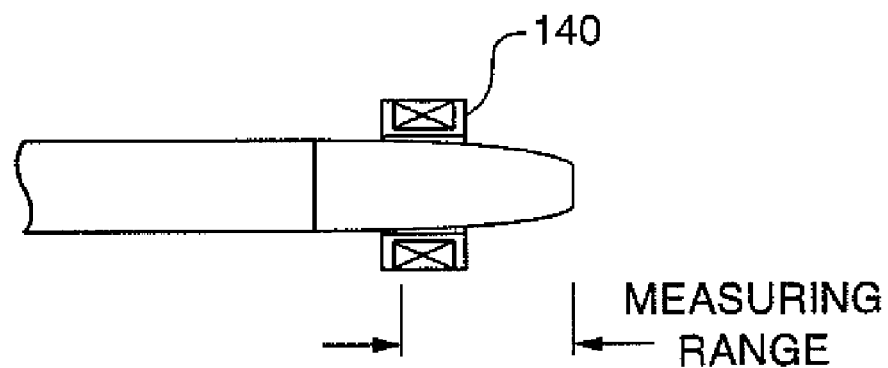
FIGS. 4a, 4b show another embodiment of a sensing element of this invention.
Figure 4B:
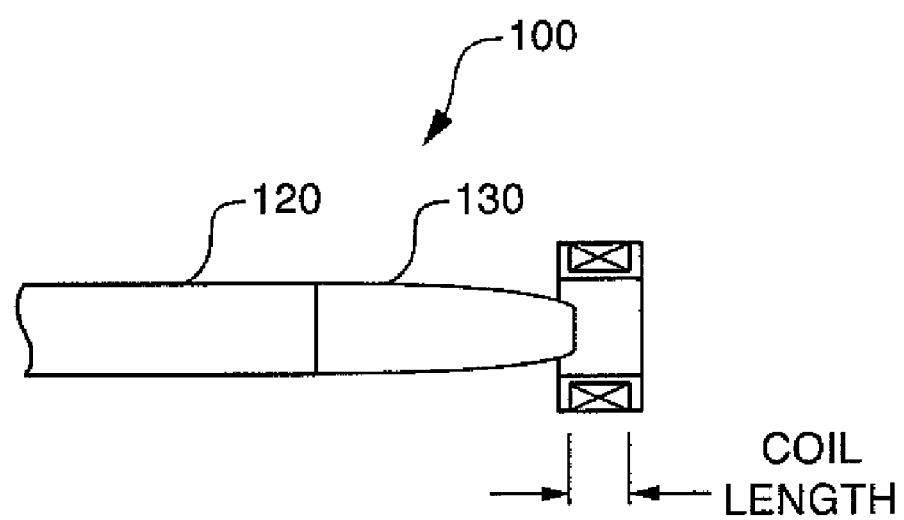

FIGS. 4a, 4b show an embodiment of another sensor of this invention. An actuator (movable substantially linear element) 100 has a tapered end 130 that moves through a sensing element 140 capable of generating electromagnetic fields. In the embodiment shown, the actuator 100 is comprised of a body 120 which is made on a substantially non-conducting material and of a region (tapered end) 130, which has a metallic (substantially conductive) coating. In one instance, as the portion of the volume of the tapered end 130 that is in the interior space of the sensing element 140 varies, the output of the sensor circuit varies. The tapered end 130 can, in one embodiment (but the present invention is not limited to only this embodiment) have a shape made of a number of small steps or, in another embodiment, can have a curved shape that is a truncated parabola. A sensing element geometry and associated taper geometry can be developed that will produce linearity of output better than 1% of the measuring range. Also, the measuring range can be much longer than the length of the sensing element. In one embodiment, the actuator 100 is an aluminum actuator. (The actuator, in this embodiment, moves in a direction substantially parallel to a central axis of the sensing element 140.)

In one instance, the sensing element 140 is a coil. In another instance, the sensing element 140 is a capacitor with fringing fields.

In one embodiment, region 130 of shaft 100 has an electrically conductive material deposited on the surface of region 130 of shaft (actuator) 100. The material is deposited in a substantially continuous manner in order to poses good electrical conductivity. In one embodiment, the deposited material can be vapor deposited aluminum or other conducting metal and the body 120 may be made of a polymer or ceramic material.

Figure 5A:
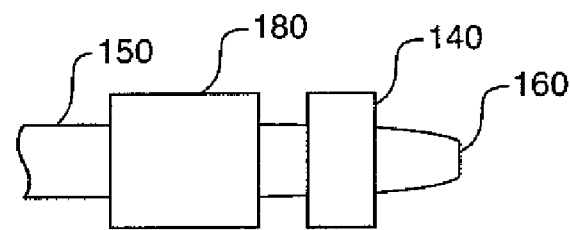
FIGS. 5a-5c show a further embodiment of a sensing element of this invention.
Figure 5B:
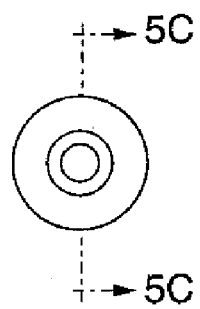
Figure 5C:
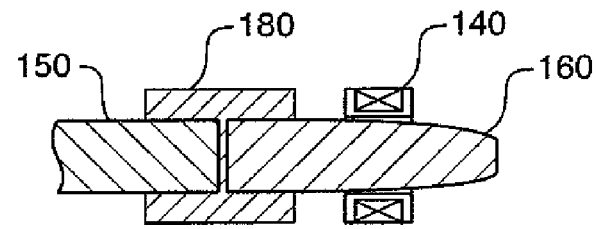

FIGS. 5a-5c show an alternate embodiment in which the actuator is substantially electrically insulated from external sources. An alternate arrangement for acquiring an electrically isolated sensor actuator region is shown in FIGS. 5a-5c. Metallic shaft 150 is fixed to insulating coupling 180. Metallic actuator 160 is fixed into insulating coupling 180 in such a way that there is no electrical continuity between shaft 150 and actuator 160. Also, the surface area of shaft 150 that is adjacent to actuator 180 is small.

Figure 6A:
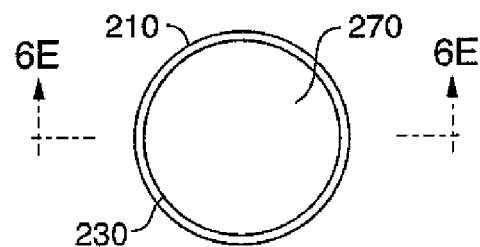
FIGS. 6a-6e depict an embodiment of an induction sensor device of this invention.
Figure 6B:
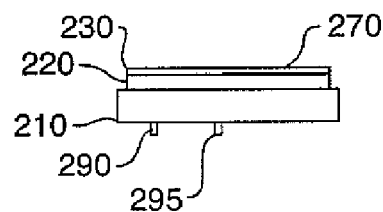
Figure 6C:
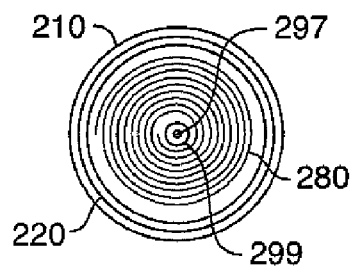
Figure 6D:
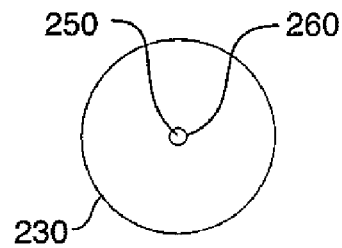
Figure 6E:
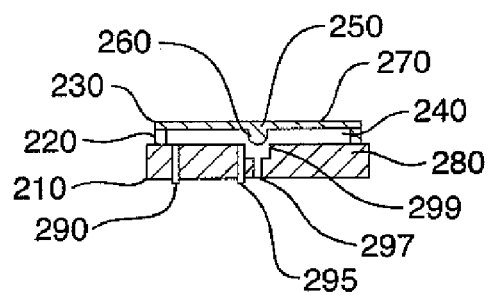

FIGS. 6a-6e show an embodiment of an induction sensor device for indicating fluid pressure. FIGS. 6a-6e depict a flat wound coil (in one instance, but not limited to, printed circuit board or vacuum deposited) used with a actuator attached to a resilient means for use as a fluid pressure transducer. FIG. 6a is a top view of the sensor showing the surface 270 of top member 230. FIG. 6b is an edge view of the sensor showing a base member (substantially flat substrate) 210 which can be a section of printed circuit attached to annular ring 220 (an embodiment of a continuous edge substructure) which is in turn attached to top member 230. Members 210, 220, and 230 may all be made of the same printed circuit board material or they may be made of other substantially non-conducting (insulating) material. FIG. 6e is a sectional view of the sensor as indicated by numerals AA. Circular base member (substantially flat substrate) 210 has cavity (depressed area) 299 at its center. About cavity 299, a substantially flat spiral coil 280 is constructed by a method such as, but not limited to, etched printed circuit board techniques or by vacuum metal buildup. Conductors 290 and 295 penetrate through openings in the base member 210 and provide electrical connection to the coil 280. Base 210, annular ring (continuous edge substructure) 220, and top member (top substructure) 230 define cavity 240. The top member 230 has a protrusion (protruding section) 250 which extends from the surface of the top member 230 into a central cavity 240 opposite the depressed area 299. The protrusion 250 has deposited on its surface a substantially electrically conducting coating 260. Pressure exerted on surface 270 causes top member 230 to (elastically) deform into the cavity 240 and the protrusion 250 with coating 260 to travel in the high electromagnetic flux region at the depressed area (cavity) 299. A change of position of the coated area 260 relative to the coil 280 causes the associated circuit shown in FIG. 1a to have a change in output. FIG. 6c is a plane view of base member 210 on the surface adjacent to the central cavity 240. FIG. 6d shows a plane view of the top member 230 on the surface adjacent to the central cavity 240. It is noted that the coating 260 may also cover the entire surface of the member 230 that is adjacent to the central cavity 240. Port 297 is provided for venting or alternately may be plugged with a gas or vacuum in the central cavity 240.

During use of the embodiment of the system of this invention shown in FIGS. 6a-6e, fluid pressure is sensed by providing a structure having a section capable of deforming in response to fluid pressure where the deformation determines a varying reactance, utilizing the varying reactance in an oscillator circuit and obtaining an output indicative of a variation in frequency (caused by the varying reactance) of the oscillator circuit. The variation in frequency is indicative of the fluid pressure.

Figure 7A:
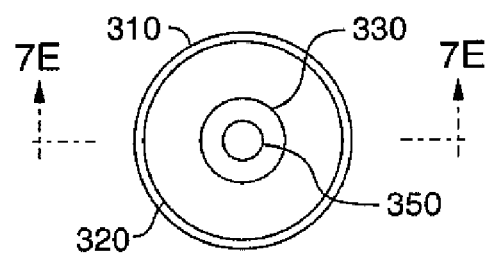
FIGS. 7a-7e depict another embodiment of an induction sensor device of this invention.
Figure 7B:
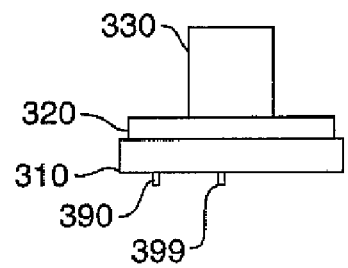
Figure 7C:
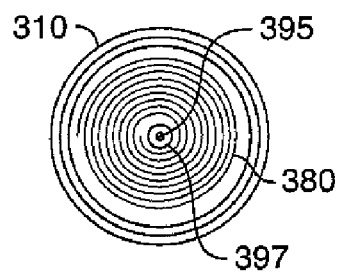
Figure 7D:
Figure 7E:
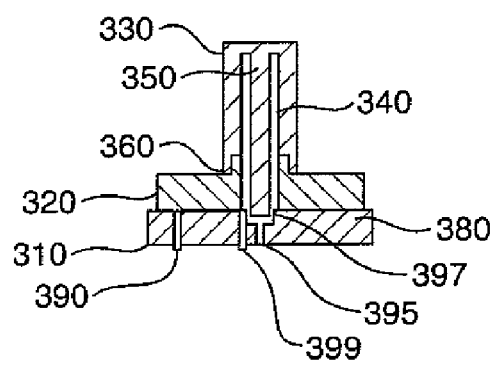

FIGS. 7a-7e show an embodiment of an induction sensor device for indicating temperature. FIGS. 7a-7e depict a flat wound coil (in one instance, but not limited to, printed circuit board or vacuum deposited) used with an actuator attached to a thermal expansion means for use as a temperature transducer. FIG. 7a is a top view of the sensor. FIG. 7b is an edge view of the sensor showing base member 310 which can be in one instance, but not limited to, a section of printed circuit attached to annular ring (an embodiment of a cover substructure) 320 which is in turn attached to top member 330. Members 310 and 320 may be made of, in one instance, but not limited to, the same printed circuit board material or they may be made of other substantially insulating (non-conducting) material. FIG. 7e is a sectional view of the sensor as indicated by numerals AA. The circular (in one embodiment, but not limited to only this embodiment) base member 310 has a cavity (depressed area) 397 at its center. About cavity 397, a coil 380 is constructed by a method such as, but not limited to, etched printed circuit board techniques or by vacuum metal buildup. (In one embodiment, the depressed area is located substantially at a center of said substantially flat spiral coil.) Two conductors 390, 399 penetrate through two openings in the member 310 and provide electrical connection to the coil 380. The ring 320 may be in contact with the coil 380 on the surface of the coil that faces the base 310. (In one embodiment, the opening of the ring is substantially congruent with and substantially located over the depressed area.) A cylinder (an embodiment of a continuous side section and a top section) 330 is fixed to the ring 320 at one end and has a rod (an embodiment of an inner substructure) 350 fixed to the other end. The base cavity 397, ring 320, cylinder 330 and rod 350 define a central cavity 340. In one embodiment, the rod 350 has deposited on its surface electrically conducting coating 360 at least at the end that is adjacent to the base cavity 397. In another embodiment, the rod 350 may be a conductor. The cylinder 330 and the rod 350 are made of materials that have different rates (coefficients) of thermal expansion. Temperature change causes the cylinder 330 to change its length more or less than the rod 350 causing the end at 360 to travel in the high electromagnetic flux region at base cavity 397. Change of position of the conducting area 360 relative to the coil 380 causes the associated circuit shown in FIG. 1a to have a change in output (due to a change in reactance). FIG. 7c is a plane view of the base member 310 on the surface adjacent to cavity 340. FIG. 7d shows an end view of the rod 350 with a coating 360 on the end adjacent to the central cavity 340. A port 395 is provided for venting or alternately may be plugged with a gas or vacuum in the central cavity 340.

During use of the embodiment of the system of this invention shown in FIGS. 7a-7e, temperature is sensed by providing a structure having two sections capable of relative displacement in response to temperature where the relative displacement determines a varying reactance, utilizing the varying reactance in an oscillator circuit and obtaining an output indicative of a variation in frequency (caused by the varying reactance) of the oscillator circuit. The variation in frequency is indicative of the temperature.

Not desiring to be bound by theory, the embodiments described above are not limited by the description of the physical mechanisms detailed above.

Although the invention has been described with respect to various embodiments, it should be realized this invention is also capable of a wide variety of further and other embodiments within the spirit and scope of the appended claims.

What is claimed is:

1. A sensor circuit comprising:
an oscillator circuit, said oscillator comprising:
  a variable inductor; and
  a variable capacitor;
    said variable capacitor comprising a variable capacitance and a fixed capacitance;
    said variable capacitor providing an electrical connection between ground and said variable inductor;
    said variable capacitor being connected in series with said variable inductor;
    said variable inductor being also electrically connected to another component in said oscillator circuit; and
    said variable inductor and said variable capacitance constituting a variable reactance.

2. A sensor circuit comprising:
an oscillator circuit, said oscillator comprising:
  a variable inductor; and
  a variable capacitor;
    said variable capacitor comprising a variable capacitance and a fixed capacitance:
    said variable capacitor providing an electrical connection between around and said variable inductor;
    said variable inductor being also electrically connected to another component in said oscillator circuit; and
    said variable inductor and said variable capacitance constituting a variable reactance;
another capacitor; and
an amplifier;
wherein said another capacitor being located in a feedback path from the connection between said variable inductor and said variable capacitor to said amplifier.

3. The sensor circuit of claim 2 wherein output is provided as an oscillatory signal having a frequency.

4. The sensor circuit of claim 2 wherein output is provided as a signal selected from the group consisting of a sine wave, a square wave and a DC signal.

5. The sensor circuit of claim 2 wherein said variable reactance is obtained from a physical structure.

6. The sensor circuit of claim 5 wherein said physical structure comprises:
  a movable substantially linear element;
  a sensing element capable of generating electromagnetic fields; and
  a spatial relationship between said movable substantially linear element and said sensing element determining said variable reactance.

7. The sensor circuit of claim 6 wherein said movable substantially linear element is capable of moving in a direction substantially parallel to a central axis of said sensing element.

8. The sensor circuit of claim 7 wherein said movable substantially linear element comprises:
  a first section comprised of a substantially nonconducting material; and
  a second section comprising a substantially continuous coating of a substantially conductive material;
  said second section bean proximate to said sensing element and being operatively connected to said first section.

9. The sensor circuit of claim 8 wherein said second section comprises a substantially tapered section;
  said substantially tapered section being proximate to said sensing element and having a small cross-section in an end nearest to said sensing element.

10. The sensor circuit of claim 7 wherein said movable substantially linear element comprises:
  a first section comprised of a substantially conductive material;
  a second section comprised of a substantially insulating material; said first section being operatively connected to said second section; and
  a third section comprised of a substantially conductive material; said second section being operatively connected to said third section;
  said second section substantially electrical isolating said first section from said third section.

11. The sensor circuit of claim 5 wherein said physical structure comprises:
  a first substructure comprising:
    a first end portion;
    a second end portion;

a base portion connecting said first end portion and said second end portion and on which said first end portion and said second end portion are disposed;

a central portion disposed on said base portion and spaced apart from said first end portion and said second end portion;

a coil wound on said central portion; said coil being capable of carrying an electrical current;

a second substructure disposed over and substantially separated from said first substructure; a surface of said second substructure being proximate to said central portion; and a spatial relationship between said first substructure and said second substructure determining said variable reactance.

12. The sensor circuit of claim 11 wherein said first substructure comprises a ferrimagnetic material.

13. The sensor circuit of claim 11 wherein said second substructure comprises a substantially conductive material.

14. The sensor circuit of claim 11 wherein said first substructure comprises a substantially conductive material.

15. The sensor circuit of claim 11 wherein said second substructure comprises a structure having a property to be sensed.

16. The sensor circuit of claim 15 wherein said second substructure comprises a structure capable of rotation and having a radially nonuniform cross-section;

and wherein the property to be sensed is an angular displacement.

17. The sensor circuit of claim 11 wherein said central portion, said first end portion and said second end portion comprise a substantially conductive material; and wherein said base portion comprises a substantially insulating material.

18. The sensor circuit of claim 5 wherein said physical structure comprises:

a substantially flat substrate comprised of an electrically insulating material;

a substantially flat spiral coil disposed on one side of said substantially flat substrate;

said substantially flat substrate having two openings, one of said two openings located proximate to one end of said substantially flat spiral coil, another one of said two openings located proximate to another end of said substantially flat spiral coil;

a continuous edge substructure substantially surrounding and substantially spaced apart from said substantially flat spiral coil; said continuous edge substructure disposed on said one side of said substantially flat substrate;

a top substructure disposed on said continuous edge substructure; said top substructure comprising a protruding section disposed on a side of said top substructure proximate to said substantially flat spiral core; said top substructure being capable of elastic deformation; and a displacement of said protruding section relative to said substantially flat substrate determining said variable reluctance.

19. The sensor circuit of claim 18 wherein said protruding section comprises a coating of a substantially conductive material.

20. The sensor circuit of claim 5 wherein said physical structure comprises:

a substantially flat substrate comprised of an electrically insulating material;

a substantially flat spiral coil disposed on one side of said substantially flat substrate;

said substantially flat substrate having two openings, one of said two openings located proximate to one end of said substantially flat spiral coil, another one of said two openings located proximate to another end of said substantially flat spiral coil; said substantially flat substrate comprising a depressed area on said one side of said substantially flat substrate, said depressed area being located substantially at a center of said substantially flat spiral coil;

a cover substructure comprised of a substantially insulating material and disposed over said substantially flat spiral coil, said cover substructure comprising an opening substantially congruent with and substantially located over said depressed area;

a top substructure adapted to be aft ached to said cover substructure, said top substructure comprising:

a continuous side section substantially surrounding said depressed area, and a top section disposed over said side section;

an inner substructure adapted to be attached to said top section, said inner substructure having a length at most equal to a height of said side section and cross sectional area smaller then said depressed area, said inner substructure extending from said top section towards said depressed area; said inner substructure comprising a material having a thermal expansion coefficient not equal to a thermal expansion of coefficient of said side section; and a displacement of said inner substructure relative to said substantially flat substrate determining said variable reluctance.

21. The sensor circuit of claim 20 wherein an end, said end being proximate to said substantially flat spiral coil, of said protruding section comprises a coating of a substantially conductive material.

22. The sensor circuit of claim 20 wherein said substantially flat substrate comprises another opening located at substantially a center of said depressed area.

23. The sensor circuit of claim 5 wherein said physical structure comprises:

a first substructure capable of producing a fringing electromagnetic field;

a second substructure disposed proximate to said first substructure and capable of modifying the fringing electromagnetic field; and a spatial relationship between said first substructure and said second substructure determining said variable reactance.

24. The sensor circuit of claim 23 wherein said second substructure comprises a ferrimagnetic material.

25. The sensor circuit of claim 23 wherein said second substructure comprises a substantially conductive material.

26. The sensor circuit of claim 23 wherein said second substructure comprises a structure having a property to be sensed.

27. The sensor circuit of claim 26 wherein said second substructure comprises a structure capable of rotation and having a radially nonuniform cross-section;

and wherein the property to be sensed is an angular displacement.

* * * * *

UNITED STATES PATENT AND TRADEMARK OFFICE
CERTIFICATE OF CORRECTION

PATENT NO. : 7,511,476 B2 Page 1 of 1
APPLICATION NO. : 11/325143
DATED : March 31, 2009
INVENTOR(S) : G. Brandt Taylor et al.

It is certified that error appears in the above-identified patent and that said Letters Patent is hereby corrected as shown below:

In column 8, line 8 (claim 2), "around" should be -- ground --

In column 8, line 44 (claim 8), "section bean proximate" should be -- section being proximate --

In column 10, line 17 (claim 20), "aft ached to said cover" should be -- attached to said cover --

Signed and Sealed this

Fifth Day of May, 2009

JOHN DOLL
*Acting Director of the United States Patent and Trademark Office*